(12) United States Patent
Briscoe

(10) Patent No.: US 7,832,129 B2
(45) Date of Patent: Nov. 16, 2010

(54) RELEASABLE COUPLING ASSEMBLY

(75) Inventor: Terry L. Briscoe, Portland, OR (US)

(73) Assignee: ESCO Corporation, Portland, OR (US)

( * ) Notice: Subject to any disclaimer, the term of this patent is extended or adjusted under 35 U.S.C. 154(b) by 425 days.

(21) Appl. No.: 11/705,637

(22) Filed: Feb. 12, 2007

(65) Prior Publication Data
US 2007/0137072 A1 Jun. 21, 2007

Related U.S. Application Data

(63) Continuation of application No. 10/824,490, filed on Apr. 15, 2004, now Pat. No. 7,174,661, which is a continuation-in-part of application No. 10/425,934, filed on Apr. 30, 2003, now Pat. No. 7,171,771.

(51) Int. Cl.
*E02F 9/28* (2006.01)
(52) U.S. Cl. .............................. 37/455; 37/456; 37/457; 403/374.4
(58) Field of Classification Search ............ 37/446–460
See application file for complete search history.

(56) References Cited

U.S. PATENT DOCUMENTS

| | | | |
|---|---|---|---|
| 1,021,185 A | 3/1912 | Foster | |
| 1,917,431 A | 7/1933 | O'fallon | |
| 2,020,215 A | 11/1935 | Ross | |
| 2,547,789 A | 4/1951 | Skeel | |
| 3,032,152 A | 5/1962 | Titsler | |
| 3,121,289 A | 2/1964 | Eyolfson | |
| 3,410,010 A | 11/1968 | Ratkowski | |
| 3,413,740 A | 12/1968 | Peterson | |
| 3,494,245 A | 2/1970 | Helton | |

(Continued)

FOREIGN PATENT DOCUMENTS

EP 0 847 480 B1 6/1998

(Continued)

OTHER PUBLICATIONS

Illustration of V61 Hot Slag Pin Sold by ESCO Before Jul. 2, 2002.

(Continued)

*Primary Examiner*—Thomas A Beach
(74) *Attorney, Agent, or Firm*—Steven P. Schad

(57) ABSTRACT

A lock that includes a wedge that is used to releasably secure separable components of an assembly together. The wedge can be used with a spool. The wedge and spool are threadedly coupled together to drive the wedge into and out of an opening in the assembly without hammering or prying. The direct coupling of the wedge and spool eliminates the need for bolts, washers, nuts and other hardware so as to minimize the number of parts. As a result, the lock is inexpensive to make, easy to use, and unlikely to become inoperative because of lost or broken parts or due to fines or other difficulties encountered in harsh digging environments. Further, the wedge can be driven into the assembly to provide the degree of tightness necessary for the intended operation and/or to re-tighten the assembly after incurring wear during use. A latch assembly is preferably provided to securely hold the wedge in place and avoid an undesired loss of parts during use.

20 Claims, 14 Drawing Sheets

U.S. PATENT DOCUMENTS

| | | |
|---|---|---|
| 3,722,932 A | 3/1973 | Dougall |
| 3,831,298 A | 8/1974 | Helton et al. |
| 4,167,355 A | 9/1979 | Hansson |
| 4,262,892 A | 4/1981 | Wu |
| 4,267,653 A | 5/1981 | Hahn et al. |
| 4,282,665 A * | 8/1981 | Fletcher et al. ............... 37/457 |
| 4,326,348 A | 4/1982 | Emrich |
| 4,360,981 A | 11/1982 | Bierwith et al. |
| 4,372,703 A | 2/1983 | Szostak |
| 4,380,102 A | 4/1983 | Hansson |
| 4,413,432 A | 11/1983 | Bierwith |
| 4,433,496 A | 2/1984 | Jones et al. |
| 4,492,370 A | 1/1985 | Park |
| 4,540,309 A | 9/1985 | Hansson |
| 4,570,365 A | 2/1986 | Bierwith |
| 4,638,994 A * | 1/1987 | Gogarty ..................... 482/107 |
| 4,663,867 A * | 5/1987 | Hahn et al. .................... 37/459 |
| 5,052,134 A | 10/1991 | Bierwith |
| 5,068,986 A | 12/1991 | Jones |
| 5,074,062 A | 12/1991 | Hahn et al. |
| 5,134,793 A | 8/1992 | Bierwith |
| 5,144,762 A | 9/1992 | Robinson |
| 5,169,033 A * | 12/1992 | Shay ..................... 222/153.09 |
| 5,233,770 A | 8/1993 | Robinson |
| 5,272,824 A | 12/1993 | Cornelius |
| 5,311,681 A | 5/1994 | Ruvang et al. |
| 5,331,754 A | 7/1994 | Ruvang |
| 5,361,520 A | 11/1994 | Robinson |
| 5,410,826 A | 5/1995 | Immel et al. |
| 5,452,529 A | 9/1995 | Neuenfeldt et al. |
| 5,465,512 A * | 11/1995 | Livesay et al. ................ 37/457 |
| 5,469,648 A | 11/1995 | Jones et al. |
| 5,487,230 A | 1/1996 | Weyer |
| 5,491,915 A | 2/1996 | Robinson |
| 5,564,206 A | 10/1996 | Ruvang |
| 5,638,621 A | 6/1997 | Keech et al. |
| 5,653,048 A | 8/1997 | Jones et al. |
| 5,666,748 A | 9/1997 | Emrich et al. |
| 5,709,043 A | 1/1998 | Jones et al. |
| 5,713,145 A | 2/1998 | Ruvang |
| 5,718,070 A | 2/1998 | Ruvang |
| 5,784,813 A | 7/1998 | Balassa et al. |
| 5,833,323 A | 11/1998 | Massa et al. |
| 5,852,888 A | 12/1998 | Cornelius |
| 5,868,518 A | 2/1999 | Chesterfield et al. |
| 5,913,605 A | 6/1999 | Jusselin et al. |
| 5,937,549 A | 8/1999 | Bender et al. |
| 5,937,550 A | 8/1999 | Emrich |
| 5,964,547 A | 10/1999 | Brinkley |
| 5,983,534 A | 11/1999 | Robinson et al. |
| 6,009,644 A | 1/2000 | Hedley |
| 6,032,390 A | 3/2000 | Bierwith |
| 6,209,238 B1 | 4/2001 | Ruvang |
| 6,216,368 B1 | 4/2001 | Bierwith |
| 6,282,991 B1 | 9/2001 | Hu |
| 6,301,810 B1 | 10/2001 | Fidler |
| 6,321,471 B2 | 11/2001 | Fernandez Munoz et al. |
| 6,729,052 B2 | 5/2004 | Ollinger, IV et al. |
| 6,735,890 B2 | 5/2004 | Carpenter et al. |
| 6,735,891 B2 | 5/2004 | Pallas Moreno et al. |
| 6,745,503 B1 | 6/2004 | Pallas Moreno et al. |
| 6,959,506 B2 | 11/2005 | Adamic et al. |
| 6,986,216 B2 * | 1/2006 | Emrich et al. ................. 37/450 |
| 6,993,861 B2 | 2/2006 | Carpenter et al. |
| 7,090,006 B2 | 8/2006 | Salama |
| 7,526,886 B2 * | 5/2009 | McClanahan et al. ......... 37/457 |
| 2006/0010726 A1 * | 1/2006 | Emrich et al. ................. 37/456 |
| 2007/0137071 A1 * | 6/2007 | McClanahan et al. ......... 37/452 |

FOREIGN PATENT DOCUMENTS

| | | |
|---|---|---|
| ES | 2 140 121 | 2/2000 |
| GB | 2125137 A | 2/1984 |
| WO | WO00/20696 | 4/2000 |

OTHER PUBLICATIONS

Reexamination 95/000437; inc. Reexamination Req., 1st OA, the 1st Resp. by the patent owner & the 1st Reply from the Requester of Reexamination.

Reexamination 95/000467; incl. Reexamination Req., 1st OA & the 1st Response by the Patent Owner.

Reexamination 95/000467: 1st Reply from the Requester of Reexamination.

Reexamination 95/000437: Action Closing Prosecution issued Oct. 16, 2009.

Reexamination 95/000437: Patent Holder Response to Action Closing Prosecution.

Reexamination 95/000437: 3rd Party Requestors Comments.

* cited by examiner

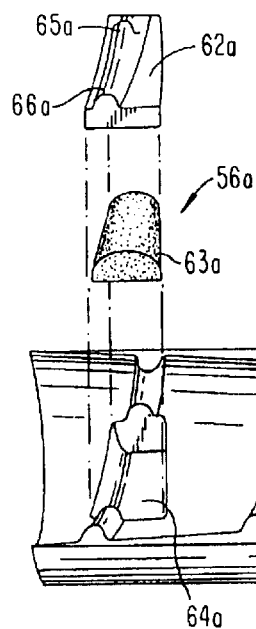
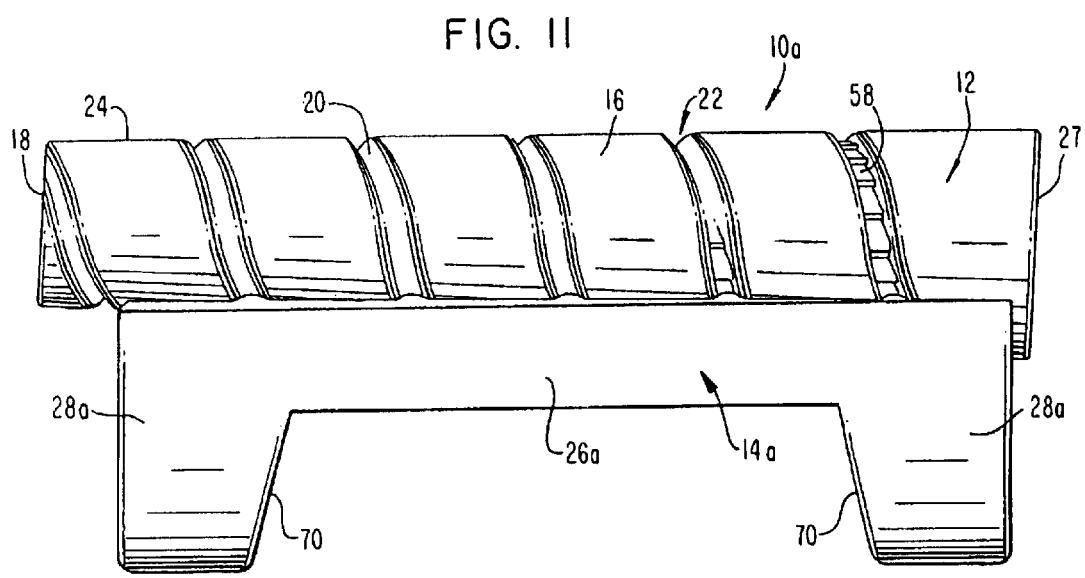

RELEASABLE COUPLING ASSEMBLY

The present application is a continuation of co-pending U.S. patent application Ser. No. 10/824,490 filed Apr. 14, 2004, which is a continuation-in-part of U.S. patent application Ser. No. 10/425,934 filed Apr. 30, 2003, now U.S. Pat. No. 7,171,771.

FIELD OF THE INVENTION

The present invention pertains to a coupling assembly for releasably securing separable parts together, and especially for securing together components of a wear assembly used in excavating or the like.

BACKGROUND OF THE INVENTION

Excavating equipment typically includes various wear parts to protect underlying-products from premature wear. The wear part may simply function as a protector (e.g., a wear cap) or may have additional functions (e.g., an excavating tooth). In either case, it is desirable for the wear part to be securely held to the excavating equipment to prevent loss during use, and yet be capable of being removed and installed to facilitate replacement when worn. In order to minimize equipment downtime, it is desirable for the worn wear part to be capable of being easily and quickly replaced in the field. Wear parts are usually formed of three (or more) components in an effort to minimize the amount of material that must be replaced on account of wearing. As a result, the wear part generally includes a support structure that is fixed to the excavating equipment, a wear member that mounts to the support structure, and a lock to hold the wear member to the support structure.

As one example, an excavating tooth usually includes an adapter as the support structure, a tooth point or tip as the wear member, and a lock or retainer to hold the point to the adapter. The adapter is fixed to the front digging edge of an excavating bucket and includes a nose that projects forward to define a mount for the point. The adapter may be a single unitary member or may be composed of a plurality of components assembled together. The point includes a front digging end and a rearwardly opening socket that receives the adapter nose. The lock is inserted into the assembly to releasably hold the point to the adapter.

The lock for an excavating tooth is typically an elongate pin member which is fit into an opening defined cooperatively by both the adapter and the point. The opening may be defined along the side of the adapter nose, as in U.S. Pat. No. 5,469,648, or through the nose, as in U.S. Pat. No. 5,068,986. In either case, the lock is inserted and removed by the use of a large hammer. Such hammering of the lock is an arduous task and imposes a risk of harm to the operator.

The lock is usually tightly received in the passage in an effort to prevent ejection of the lock and the concomitant loss of the point during use. The tight fit may be effected by partially unaligned holes in the point and adapter that define the opening for the lock, the inclusion of a rubber insert in the opening, and/or close dimensioning between the lock and the opening. However, as can be appreciated, an increase in the tightness in which the lock is received in the opening further exacerbates the difficulty and risk attendant with hammering the locks into and out of the assemblies.

The lock additionally often lacks the ability to provide substantial tightening of the point onto the adapter. While a rubber insert will provide some tightening effect on the tooth at rest, the insert lacks the strength needed to provide any real tightening when under load during use. Most locks also fail to provide any ability to be re-tightened as the parts become worn. Moreover, many locks used in teeth are susceptible to being lost as the parts wear and the tightness decreases.

These difficulties are not limited strictly to the use of locks in excavating teeth, but also apply to the use of other wear parts used in excavating operations. In another example, the adapter is a wear member that is fit onto a lip of an excavating bucket, which defines the support structure. While the point experiences the most wear in a tooth, the adapter will also wear and in time need to be replaced. To accommodate replacement in the field, the adapters can be mechanically attached to the bucket. One common approach is to use a Whisler style adapter, such as disclosed in U.S. Pat. No. 3,121,289. In this case, the adapter is formed with bifurcated legs that straddle the bucket lip. The adapter legs and the bucket lip are formed with openings that are aligned for receiving the lock. The lock in this environment comprises a generally C-shaped spool and a wedge. The arms of the spool overlie the rear end of the adapter legs. The outer surfaces of the legs and the inner surfaces of the arms are each inclined rearward and away from the lip. The wedge is then ordinarily hammered into the opening to force the spool rearward. This rearward movement of the spool causes the arms to tightly pinch the adapter legs against the lip to prevent movement or release of the adapter during use. As with the mounting of the points, hammering of the wedges into the openings is a difficult and potentially hazardous activity.

In many assemblies, other factors can further increase the difficulty of removing and inserting the lock when replacement of the wear member is needed. For example, the closeness of adjacent components, such as in laterally inserted locks (see, e.g., U.S. Pat. No. 4,326,348), can create difficulties in hammering the lock into and out of the assembly. Fines can also become impacted in the openings receiving the locks making access to and removal of the locks difficult. Additionally, in Whisler style attachments, the bucket must generally be turned up on its front end to provide access for driving the wedges out of the assembly. This orientation of the bucket can make lock removal difficult and hazardous as the worker must access the opening from beneath the bucket and drive the wedge upward with a large hammer. The risk is particularly evident in connection with dragline buckets, which can be very large. Also, because wedges can eject during service, it is common practice in many installations to tack-weld the wedge to its accompanying spool, thus, making wedge removal even more difficult.

There has been some effort to produce non-hammered locks for use in excavating equipment. For instance, U.S. Pat. Nos. 5,784,813 and 5,868,518 disclose screw driven wedge-type locks for securing a point to an adapter and U.S. Pat. No. 4,433,496 discloses a screw-driven wedge for securing an adapter to a bucket. While these devices eliminate the need for hammering, they each require a number of parts, thus, increasing the complexity and cost of the locks. The ingress of fines can also make removal difficult as the fines increase friction and interfere with the threaded connections. Moreover, with the use of a standard bolt, the fines can build up and become "cemented" around the threads to make turning of the bolt and release of the parts extremely difficult.

SUMMARY OF THE INVENTION

The present invention pertains to an improved coupling assembly for releasably holding separable parts together in a secure, easy, and reliable manner. Further, the lock of the present invention can be installed and removed simply by using a manual or powered wrench. The need to hammer or pry the lock into and out of the assembly is eliminated.

The present invention is particularly useful for securing a wear member to a support structure in conjunction with an excavating operation. The lock of the present invention is easy to use, is securely held in the wear assembly, alleviates the risk associated with hammering a lock into and out of a wear assembly, and operates to effectively tighten the wear member onto the support structure.

In one aspect of the invention, a tapered lock member is formed with a threaded formation that is used to pull the lock member into a locking position in the assembly. The lock member, then, bears against the assembly to hold the components of the assembly together. The use of a threaded formation on the lock member also reduces the risk that the lock member will be ejected during use as compared to a lock that is simply hammered into place.

In another aspect of the present invention, a wedge and a spool are threadedly coupled together to drive the wedge into and out of the wear assembly without hammering. The direct coupling of the wedge and spool eliminates the need for bolts, washers, nuts and other hardware so as to minimize the number of parts. As a result of this efficient construction, the lock is inexpensive to make, easy to use, and unlikely to become inoperative because of lost or broken parts or due to fines or other difficulties encountered in harsh digging environments. Further, the wedge can be selectively driven into the assembly to provide the degree of tightness necessary for the intended operation and/or to re-tighten the assembly after incurring wear during use.

In one preferred construction, the wedge includes a thread formation with a wide pitch to form a sizable land segment by which the wedge can directly apply pressure to the wear assembly for holding the wear member to the support structure. In one embodiment, the wedge is formed with a helical groove along its outer periphery to engage helical ridge segments formed in a generally trough shaped recess along the spool or other part of the assembly. Rotation of the wedge moves the wedge along the spool, and into and out of the wear assembly. Movement of the wedge into the assembly increases the depth of the lock, and thereby tightens the engagement of the wear member onto the support structure.

A latch assembly is preferably provided to securely hold the wedge in place and avoid an undesired loss of parts during use. In one preferred construction, the wedge is formed with teeth that interact with a latch provided in an adjacent component such as the spool, wear member or support structure. The teeth and latch are formed to permit rotation of the wedge in a direction that drives the wedge farther into the opening, and to prevent rotation in a direction that retracts the wedge. The latch may also function to retain the lock in the assembly when the wear member and/or support structures begin to wear.

The inventive lock is simple, sound, reliable, and requires only minimal components. The lock is also intuitively easy for the operator to understand. Elimination of hammering also makes replacement of a wear member easy and less hazardous. Moreover, the lock is able to provide selective tightening of the wear assembly to facilitate re-tightening of the wear members or a better original mounting when, for example, the support structure is partially worn. These and other advantageous will be evident in the drawings and description to follow.

BRIEF DESCRIPTION OF THE DRAWINGS

FIG. 10 is an exploded, perspective view of the alternative spool.

FIG. 11 is a side view of a second lock in accordance with the present invention including the alternative spool. This lock is adapted to secure an adapter to a bucket lip in a Whisler style connection.

DETAILED DESCRIPTION OF THE PREFERRED EMBODIMENTS

The present invention pertains to a coupling assembly for releasably holding separable parts together. While the invention has a broader application, it is particularly useful in releasably securing a wear member to a support structure in an excavating operation. The wear member may, for example, be a point, an adapter, a shroud or other replaceable component.

Figure 1:
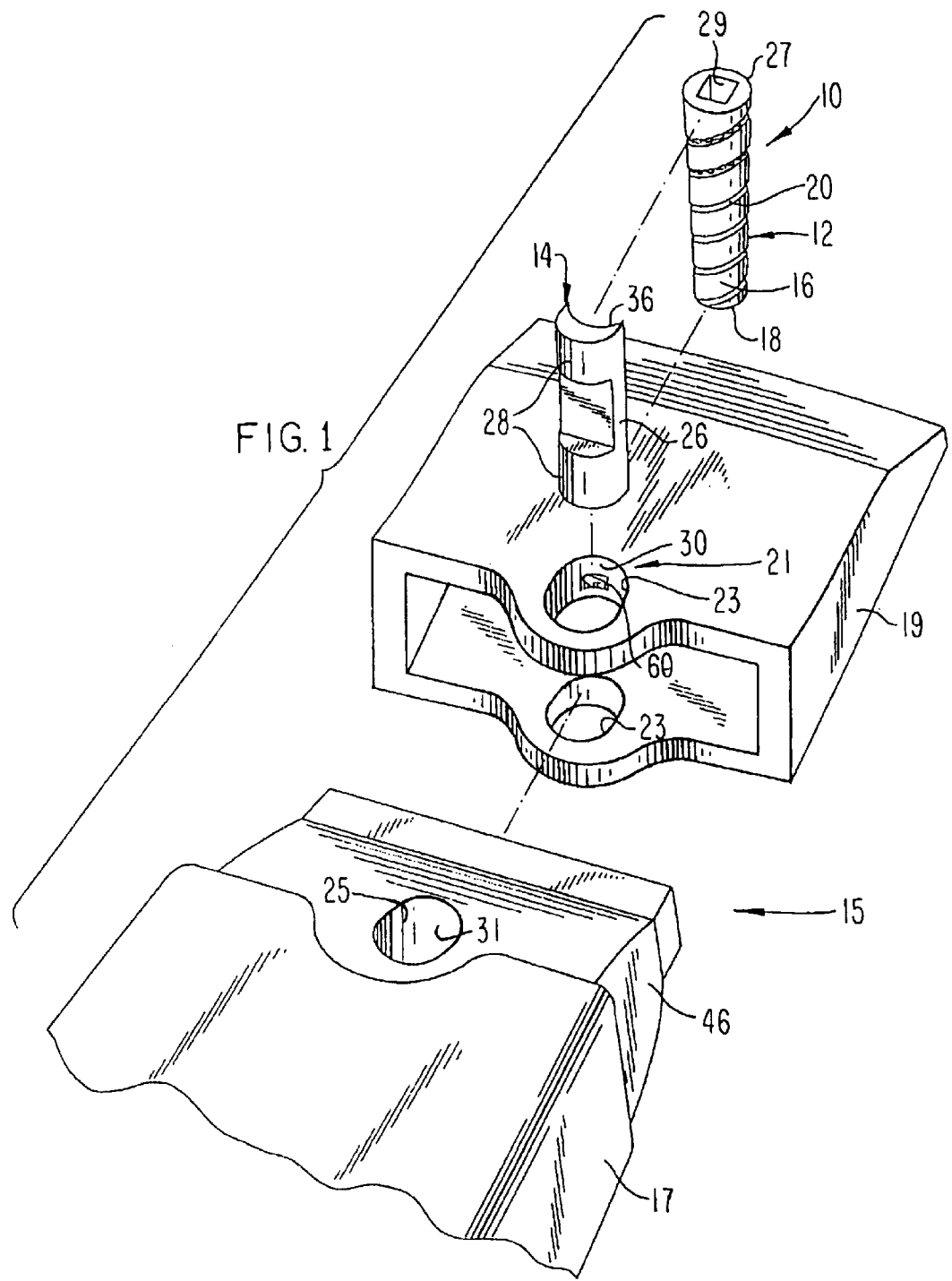
FIG. 1 is a perspective view of a coupling assembly in accordance with the present invention securing a point to an adapter.
Figure 8:
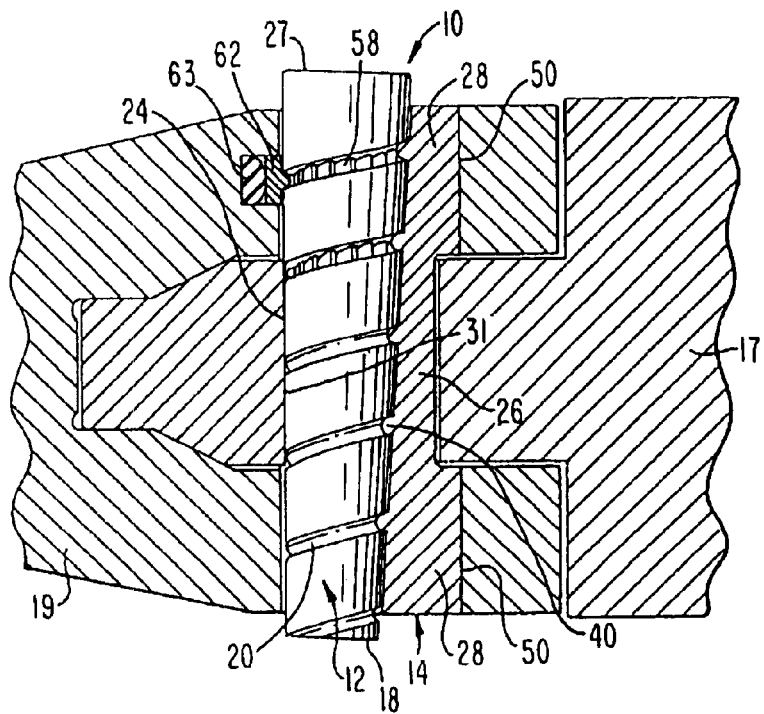
FIG. 8 is a cross-sectional view of the coupling assembly taken along line 8-8 in FIG. 1 in the assembled condition.

In one preferred construction, the lock 10 includes a wedge 12 and a spool 14 (FIGS. 2-5). Although the lock can be used to secure a wide range of components together, it is shown in FIG. 1 holding together the parts of an excavator tooth. In this embodiment of the invention, the lock is placed in a wear assembly 15 wherein the support structure is formed as an adapter 17 and the wear member is defined as a point or tip 19. Lock 10 is received into an opening 21 in wear assembly 15 that is cooperatively defined by holes 23 in point 19 and hole 25 in adapter 17 so as to releasably hold the point to the adapter (FIGS. 1 and 8). Holes 23 and 25 are each preferably elongated longitudinally to prevent misalignment of the wedge and spool, although the holes could be circular or have other shapes.

The wedge 12 preferably has a frusto-conical shape with a rounded exterior surface 16 that tapers toward a front end 18 (FIGS. 1-4). A thread formation 22, preferably in the form of a helical groove 20 with a wide pitch, is formed along the exterior surface 16 of the wedge. Accordingly, a rather wide, helically shaped land segment 24 exists between the adjacent spiraling groove segments. This land segment presents a large surface area to press against the front surface 31 of the hole 25 in adapter 17 and the wall 37 of recess 36 in spool 14. The relatively large land segment enables the lock to resist large loads with acceptable levels of stress and without the need for threads to be formed in the wall of hole 25 in the adapter. The wide pitch of the groove 20 also permits the wedge to be quickly moved into and out of the opening 21.

In one preferred construction, the pitch of the thread on the wedge is on the order of one inch and the groove forming the thread about ⅛ of an inch wide, although the pitch and groove width could vary widely. The groove is preferably formed with curved corners to form a robust thread that is not susceptible to peening or other damage. The rear end 27 of the wedge is provided with a turning formation 29 to facilitate engagement with a tool, such as a wrench, for turning the wedge. In the preferred embodiment, formation 29 is a square socket, although other arrangements could be used.

The taper of the wedge can be varied to provide an increased or decreased take-up of the wear member on the support structure. For example, if the taper of the wedge is increased, the rate at which the wear member moves to the set position on the support structure is increased, but at the expense of tightening force (i.e., more torque is required to turn the wedge). The taper of the wedge can be designed to match the particular task. In all cases the holding power of the lock would be about the same so long as the wedge is not formed too small at the forward end to provide sufficient strength.

Figure 2:
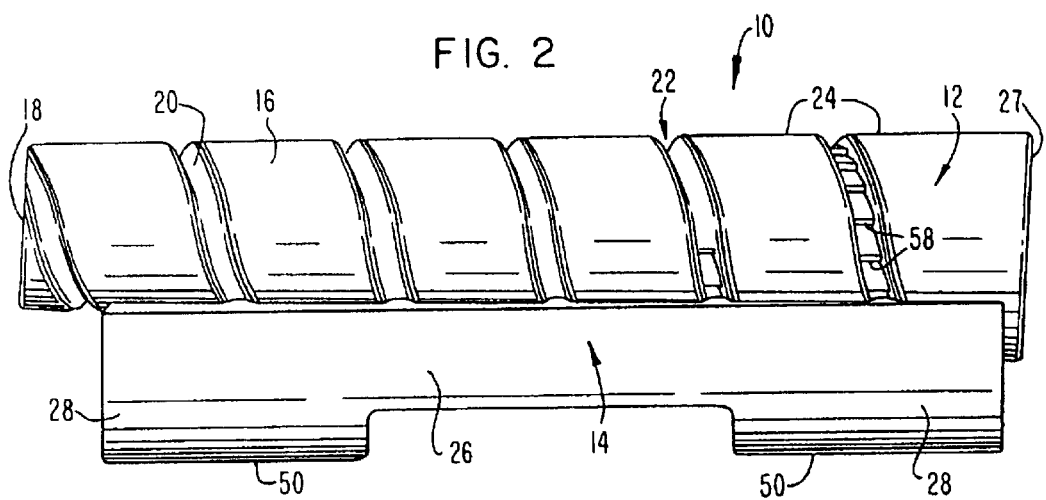
FIG. 2 is a side view of a lock in accordance with the present invention.
Figure 3:
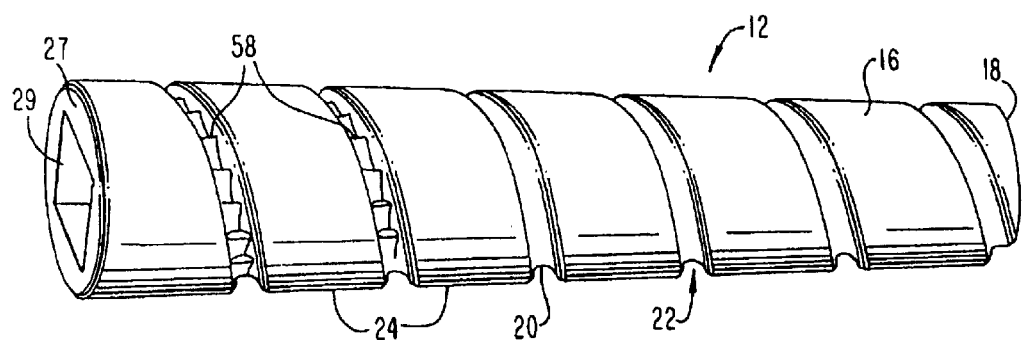
FIG. 3 is a perspective view of a wedge of the lock.
Figure 4:
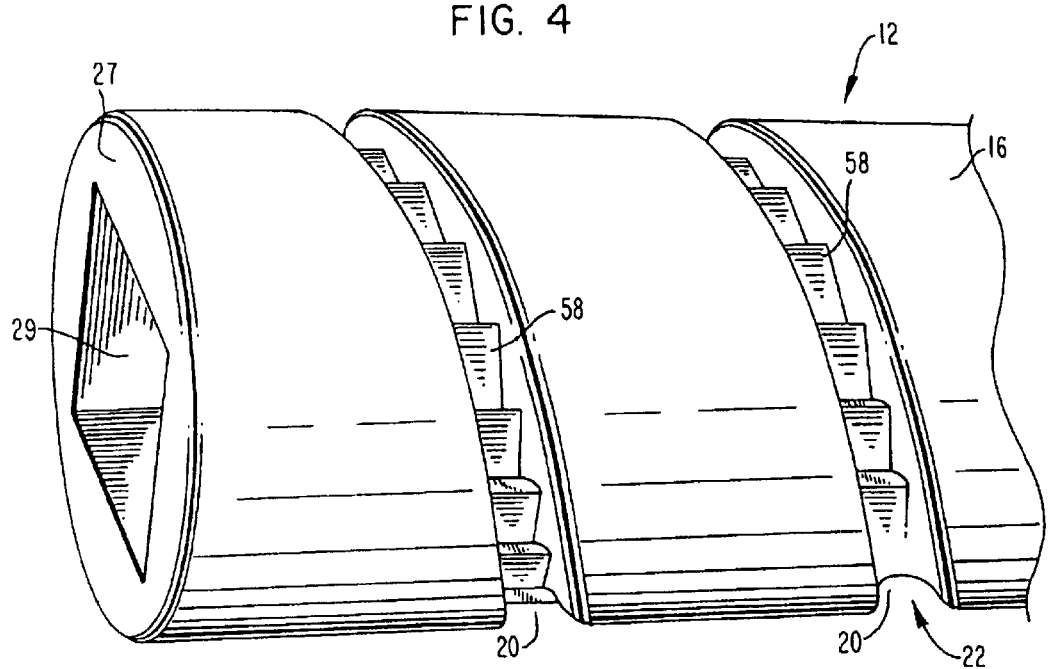
FIG. 4 is an enlarged, partial, perspective view of the wedge.
Figure 5:
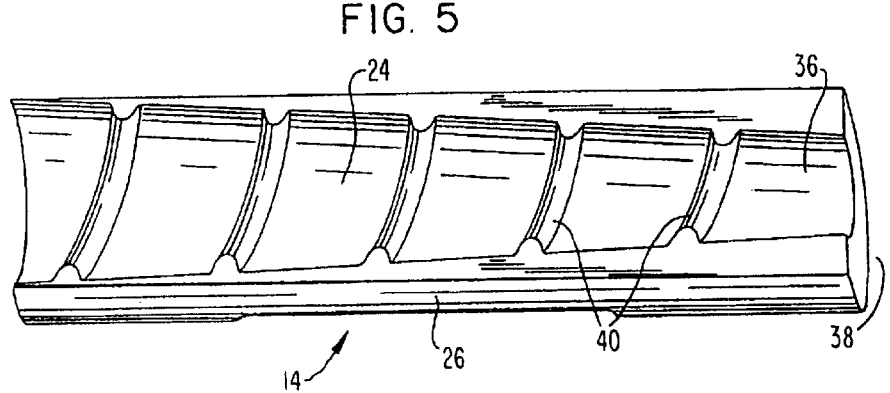
FIG. 5 is a perspective view of a spool of the lock.

The spool 14 preferably has a generally C-shaped configuration with a body 26 and arms 28 (FIGS. 1, 2 and 5). In this example, the arms are fairly short so as to press against the rear wall portions 30 of holes 23 in point 19 (FIG. 8). However, the particular shape and size of the arms can vary widely depending on the construction and use of the parts receiving the lock. Additionally, the arms could be omitted entirely if the opening in the support structure were sized to permit the rear wall of the body to press against the rear wall portions in the openings of the wear member and the spool was adequately anchored. Similarly, in this type of construction, the lock could be reversed such that the wedge pressed against the wear member and the spool against the support structure.

The body 26 of spool 14 is formed with a generally trough shaped recess 36 to receive a portion of the wedge (FIG. 5). The recess is provided with a thread formation 42 that is defined as at least one projection to fit within groove 20. In this way, the wedge and spool are threadedly coupled together. Although the projection can take the form of a wide range of shapes and sizes, recess 36 preferably includes multiple ridges 40 on the spool to complement groove 20 on wedge 12. The ridges 40 are shaped as helical segments having the same pitch as the helical groove 20 so that the ridges are received into the groove to move the wedge in or out of the opening when the wedge is rotated. While ridges 40 are preferably provided along the entire length of recess 36, fewer ridges or even one ridge could be provided if desired. Further, each ridge preferably extends across the entire recess 36, but can have a lesser extension if desired.

In the preferred construction, the helical groove 20 has the same pitch along the length of the wedge. Since the wedge is tapered, the angle of the thread changes to become more shallow as the groove extends from the forward end 18 to the rear end 27. This variation requires the allowance of clearance space between the internal and external thread so they can cooperate and avoid binding with each other. This construction, then, forms relative loose fitting threads.

Figure 6:
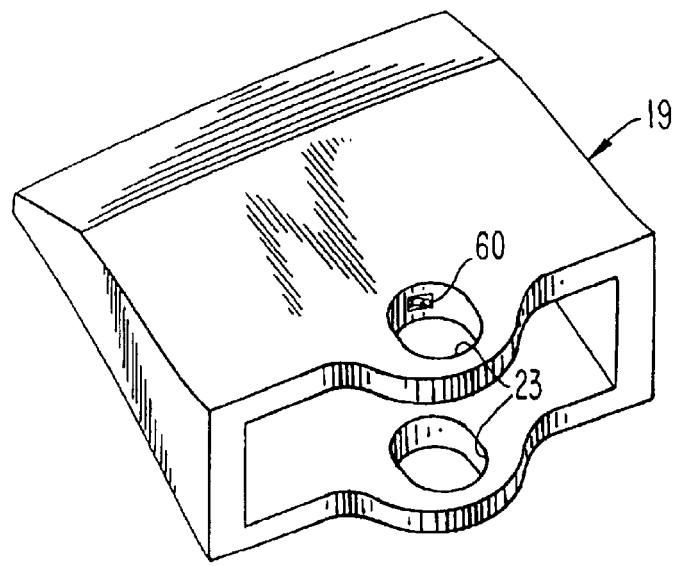
FIG. 6 is a perspective view of a wear member having a latch of the inventive coupling assembly.
Figure 7:
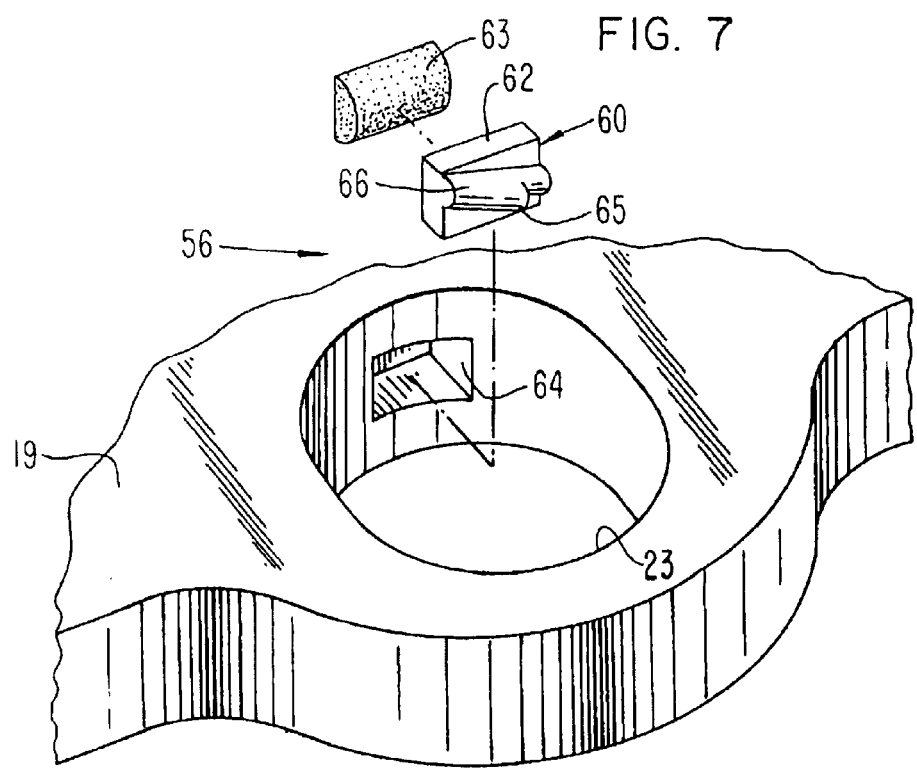
FIG. 7 is a partial, exploded, perspective view of the wear member shown in FIG. 6.
Figure 9:
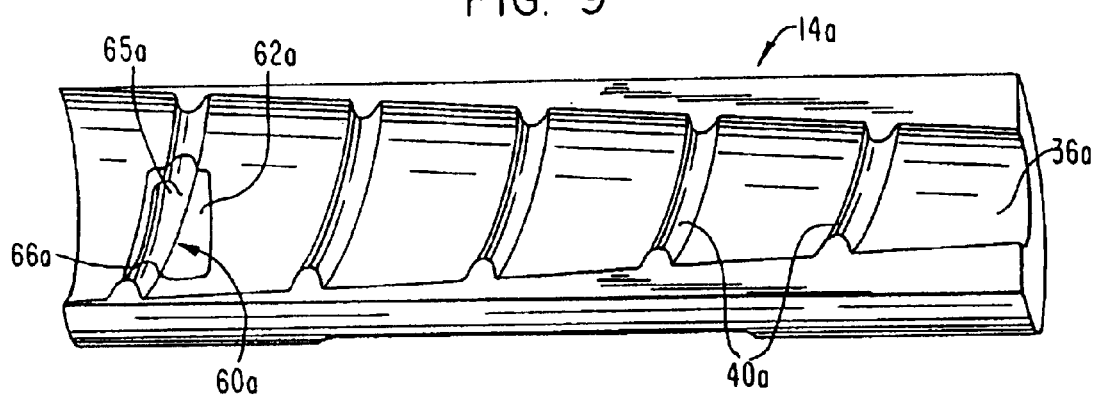
FIG. 9 is a perspective view of an alternative spool for the lock.

As an alternative construction, a ridge(s) to engage groove 20 on the wedge could be formed on the front wall portion of the hole 23 defined in point 19 in addition to or in lieu of the ridges 40 on the spool. The ridge could simply be provided by the body 62, as seen in FIGS. 6 and 7, but could also include an extension and/or other ridges on the front wall portion of the hole, similar to the inclusion of body 62a in spool 14a (as seen in FIGS. 9 and 10). Similarly, one or more ridges (or other projections) to engage groove 20 could instead be formed on the wall structure of the hole 25 in adapter 17 (in addition to or in lieu of the other ridges). In these alternatives where a thread formation is formed on the point and/or adapter, the wedge could be inserted into the opening without a spool to hold the wear member to the support structure. As can be appreciated, the hole in the point would need to be smaller to permit direct bearing contact between the wedge and the rear wall portions of the holes in the point or the ridge provided on the rear wall of the opening.

Figure 15:
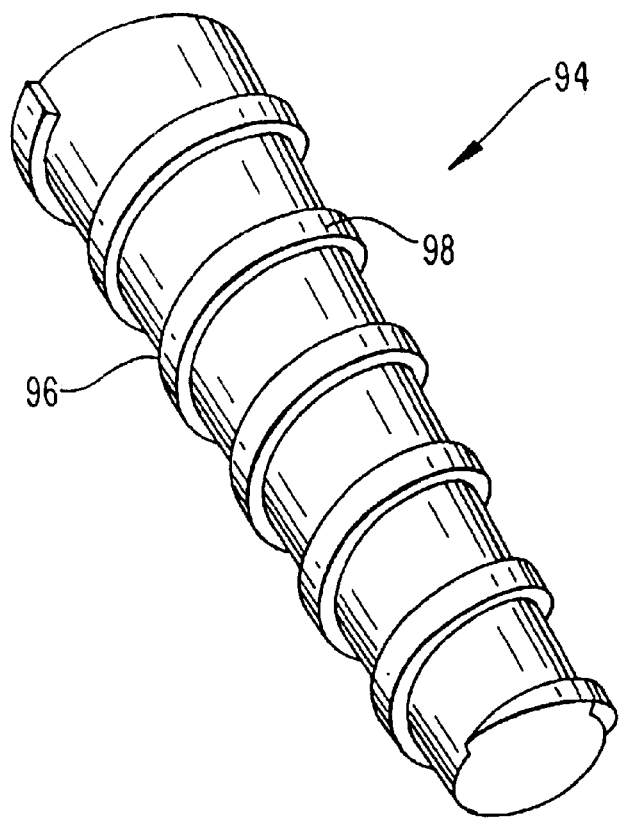
FIG. 15 is a perspective view of an alternative wedge construction.
Figure 16:
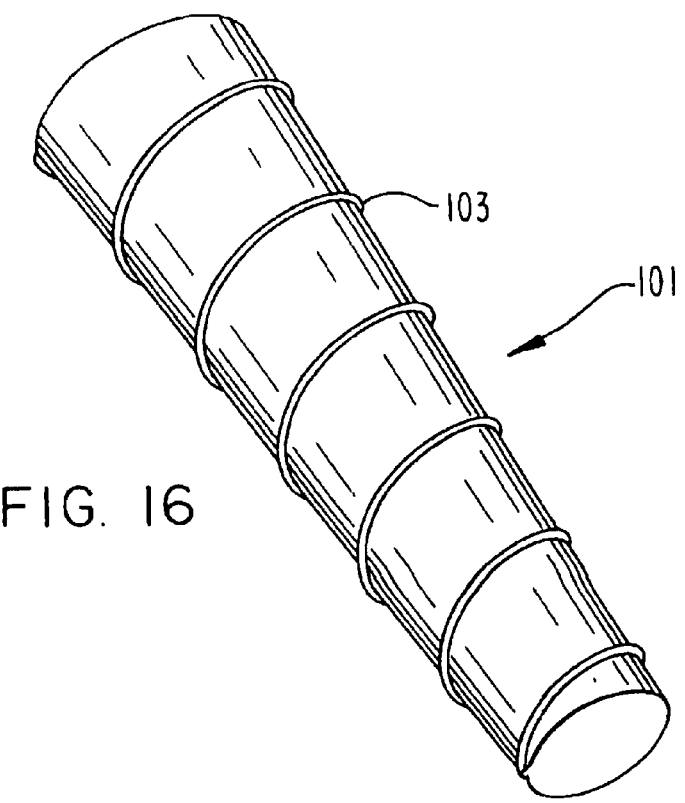
FIG. 16 is a perspective view of another alternative wedge construction.

The thread formations may also be reversed so that grooves are formed in the point, adapter and/or spool to receive a helical ridge formed on the wedge. While a ridge may be used to form the thread on the wedge with grooves only in the spool and not in the adapter wall (or vice versa), the ridges do not form as good a bearing surface as land segment 24 without the matching grooves in the opposing surfaces. Nevertheless, a helical ridge on the wedge may be used even with a smooth adapter wall and/or smooth recess in the spool in lower stress environments. In this alternative, the wedge 94 would preferably have a ridge 96 with a blunt outer edge 98 (FIG. 15). Nevertheless, the provision of a ridge on the wedge could be designed to bite into the adapter wall and/or spool. Finally, the wedge 101 could be formed with a tapping ridge 103 that cuts a thread in the spool and/or adapter wall as it is threaded into the assembly (FIG. 16).

Recess 36 in spool 14 preferably tapers toward one end 38 to complement the shape of the wedge and position forward portions of the land segment 24 bearing against the adapter to be generally vertical for a solid, secure contact with the nose of adapter 17 (FIGS. 5 and 8). This orientation stabilizes the wedge and lessens the stresses engendered in the components when the wedge is inserted tightly into the wear assembly 15. In a preferred construction, the recess is tapered at twice the taper of the wedge so as to place forward portions of the land segment 24 in a vertical orientation (as illustrated). As can be appreciated, the purpose of this construction is to orient the forward portions of the land segment substantially parallel to the wall of the member which they engage as opposed being in a strictly vertical orientation. In the preferred construction, recess 36 is provided with a concave curve that is designed to complement the shape of the wedge when the wedge is at the end of its projected travel in a tightening direction. In this way, the wedge is best able to resist the applied loads and not bind with the spool during tightening. Nevertheless, other shapes are possible.

In use, lock 10 is inserted into opening 21 in the wear assembly 15 when the wear member 19 is mounted on the nose 46 of adapter 17 (FIGS. 1 and 8). The lock 10 is preferably placed into opening 21 as separate components (i.e., with the spool being inserted first) but may in some cases be inserted collectively as a unit (i.e., with the wedge placed partially into the recess 36). In either case, the free ends 50 of arms 28 are placed in engagement with the rear wall portions 30 of holes 23 in wear member 19. The wedge is then rotated to drive it into opening 21 so that the forward portions of land segment 24 of wedge 12 press against the front wall portion 31 of hole 25, and arms 28 of spool 14 press on the rear wall portions 30 of holes 23. Continued rotation of the wedge further enlarges the depth of the lock (i.e., the distance in a direction parallel to the axis of the movement of the point onto the adapter nose) so that the arms 28 push the wear member 19 farther onto the support structure 17. This rotation is stopped once the desired tightness has been achieved. By using a tapered wedge in the lock receiving opening 21, a significant clearance exists between much of the wedge and the walls of the opening. As a result, fines from the digging operation would generally not become firmly impacted into the opening. Even if fines did become impacted in the opening, the wedge would still be easily retracted by turning the wedge with a wrench. The tapered shape of the wedge makes the opening around the lock larger at the bottom of the assembly in the illustrated orientation. With this arrangement, the fines tend to fall out as the wedge is loosened. The relatively wide groove in the wedge in the preferred construction also tends to enable release of fines from the lock and thereby avoid having the lock becoming "cemented" into the assembly. Moreover, because of the tapered shape of the threaded wedge, the assembly is quickly loosened with just a short turn of the wedge. Rubber caps or the like (not shown) could be used to inhibit the ingress of fines in socket 29 if desired.

In a preferred construction, a latching assembly 56 is provided to retain the wedge in the opening. As seen in FIGS. 2-4 and 8, ratchet teeth 58 are preferably provided within groove 20 to cooperate with a latch 60. By being recessed within the groove, the teeth do not disrupt the threaded coupling of the wedge and the spool, or the engagement of the wedge with support structure 17 and spool 14. The ratchet teeth are adapted to engage latch 60, which is mounted in either the wear member 19 (FIGS. 6-8), spool 14 (FIGS. 10 and 12) or support structure 17 (not shown). The teeth are inclined to permit rotation of the wedge in a tightening direction but prevent rotation in a loosening direction. The teeth generally need to be only formed along about one third the length of groove 20 to ensure engagement of the latch with the teeth when the wedge is fully tightened for use. Of course, the teeth could be positioned along more or less than about one-third the length of the groove as desired. The number of teeth and their location on the wedge depend largely on the amount of travel expected between the parts being coupled together, and the expected wear of the components and retightening of the lock. The teeth will preferably be positioned along the rear end of the wedge, i.e., where the wedge is widest, so that the latch 60 is securely engaged against the teeth and stress in the wedge is minimized. Nevertheless, other arrangements are possible. The teeth may have a reversible style that inhibits unwanted turning in both directions, but which will permit turning under the force of a wrench or the like—i.e., the detent can retract under sufficient load to permit rotation of the wedge in the tightening or untightening directions. Further, omission of the teeth is possible. Another alternative is to design latch 60 to apply a force on the wedge to frictionally inhibit inadvertent turning of the wedge during use.

Latch 60 preferably comprises a body 62 and a resilient member 63 that are fit within a cavity 64 that is open in one of the holes 23 (FIGS. 6 and 7). The body is provided with a detent 65 to engage ratchet teeth 58 on the wedge 12. The resilient member presses the detent 65 into engagement with the ratchet teeth and permits the body to retract into the cavity as the wider portions of the wedge are driven into opening 21. In the preferred construction, body 62 includes a helical ridge 66 that complements ridges 40 on spool 14, i.e., the ridge has the same pitch and is positioned to match the trajectory of ridges 40. Since the spool is placed into opening 21 by the operator, cavity 64 may receive body 62 with clearance to enable the body to shift as needed to ensure that ridge 66 complements ridges 40. The clearance need not be great (e.g., on the order of 0.03 of an inch in larger systems) because the spool has only a small range of adjustment where it can be properly positioned with the arms against the walls defining holes 23. Additionally, groove 20 could be formed with a narrowing width as it extends from front end 18 of wedge 12 toward rear end 27. In this way, the groove could become easily engaged with ridges 40 on spool 14 and ridge 66 on body 62, even if initially misaligned, and gradually shift body 62 into alignment with ridge 40 as the groove narrows. The body 62 is preferably bonded to resilient member 63 by an adhesive (or via casting), which in turn, is bonded in cavity 64 by an adhesive. Nevertheless, the body and resilient member could be held in cavity 64 by friction or other means. The body is preferably composed of plastic, steel or any other material that provides the requisite force to hold the wedge from turning during operation of the excavator and the resilient member of rubber, although other materials could be used.

In use, ridge 66 is received into groove 20. As the wedge reaches a tightened position, detent 65 engages teeth 58. However, due to the inclination of the teeth and the provision of resilient member 63, the latch rides over the teeth as the wedge is rotated in the tightening direction. The detent 65 locks with teeth 58 to prevent any reverse rotation of the wedge. The detent is designed to be broken from body 62 when the wedge is turned in the release direction with a wrench. The force to break the detent is within normal forces expected to be applied by a wrench but still substantially more torque than would be expected to be applied to the wedge through normal use of the excavating tooth. Alternatively, a slot or other means could be provided to permit retraction of the latch and disengagement of the detent from the teeth for reverse rotation of the wedge. Receipt of the ridge 66 and ridges 40 in groove 20 function to retain the wedge in opening 21 even after looseness develops in the tooth on account of wearing of the surfaces.

Alternatively, the latch 60 could be positioned within a cavity formed along the front wall portion 51 of hole 25 in adapter 17. The latch would function in the same way as described above when mounted in point 19. In addition, an insert (not shown) could be positioned between wedge 12 and front wall portion 51 of hole 25 if desired. The insert may include a recess with ridges like recess 36 in spool 14 or simply have a smooth recess to receive the wedge. The insert could be used to fill the space of a large opening in the adapter (or other support structure) or to accommodate a wedge formed with threads having a smaller pitch for greater mechanical advantage or other reasons, and still provide a large surface area with which to bear against the adapter. Further, the front surface of the insert may be formed to mate with the front wall portion 51 of hole 25 to increase the bearing area between the adapter and the lock, and thereby reduce the induced stresses in the parts. A latch or the like may also be used to retain the insert in place. A latch, like latch 60, could also be provided in the insert.

In an alternative embodiment (FIGS. 9 and 10), lock 10a has the latch 60a mounted in a cavity 64a formed in recess 36a of spool 14a. In the same way as latch 60, latch 60a preferably includes a body with a helical ridge 66a and detent 65a, and a resilient member 63a. Latch 60a would operate in the same way as discussed above for latch 60. The teeth 58 on the wedge would be formed in the same way, irrespective of whether the latch is mounted in the spool, the wear member or the support structure. As seen in FIG. 9, ridge 66a would be positioned as a continuation of one of the ridges 40. Although latch 60 is shown aligned with the ridge 40 closest to rear end 27 of the wedge, the latch could be formed anywhere along recess 36a. If the latch were repositioned, the teeth 58 on wedge 12 may also need to be re-positioned in the groove 20 to engage the detent 65a of latch 60a.

Figure 12:
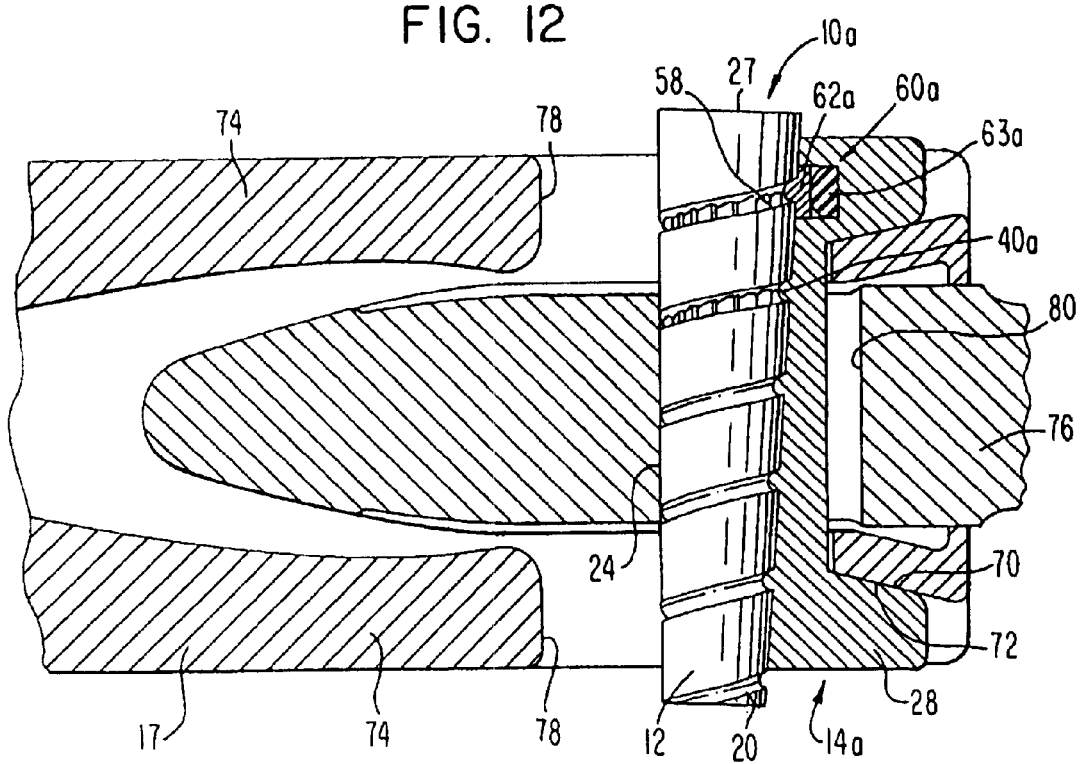
FIG. 12 is a cross-sectional view along a longitudinal axis of another wear assembly using the lock of FIG. 11.

Lock 10a is illustrated with a spool 14a that is adapted for use in a Whisler-style attachment (FIGS. 11 and 12). Nevertheless, a spool with a latch, like latch 60a, could be used to secure a point to an adapter, a shroud to a lip, or to secure other separable components together. In the illustrated embodiment, arms 28a of spool 14a are formed with inner surfaces 70 that diverge as they extend away from body 26a to mate with the inclined surfaces 72 conventionally formed on the rear end of a Whisler-style adapter 17. In use, the bifurcated legs 74 of the adapter 17 straddle the lip 76 of the excavating bucket. Each of the legs includes an elongated hole 78 that is aligned with hole 80 formed in lip 76. The aligned holes 78, 80 cooperatively define an opening 82 into which lock 10a is received. As with lock 10, lock 10a is preferably installed as separate components with the spool 14a being installed in opening 82 first, but may possibly be installed as a unit with the wedge 12 only partially placed into recess 36a. In either event, once the lock 10a is inserted into opening 82, the wedge is rotated in the tightening direction to drive the wedge into the opening 82 (FIG. 12). The driving is continued until the spool arms sufficiently grip the adapter against lip. With elongated holes 78 in legs 74, the latch needs to be mounted in spool 14 or lip 80. Nevertheless, when used with such elongated openings, the lock can be re-tightened as needed in this arrangement after wear begins to occur in order to maintain the assembly in a tightened state. The variety of lock embodiments discussed above for use with the tooth can also be used in a Whisler style connection.

Figure 13:
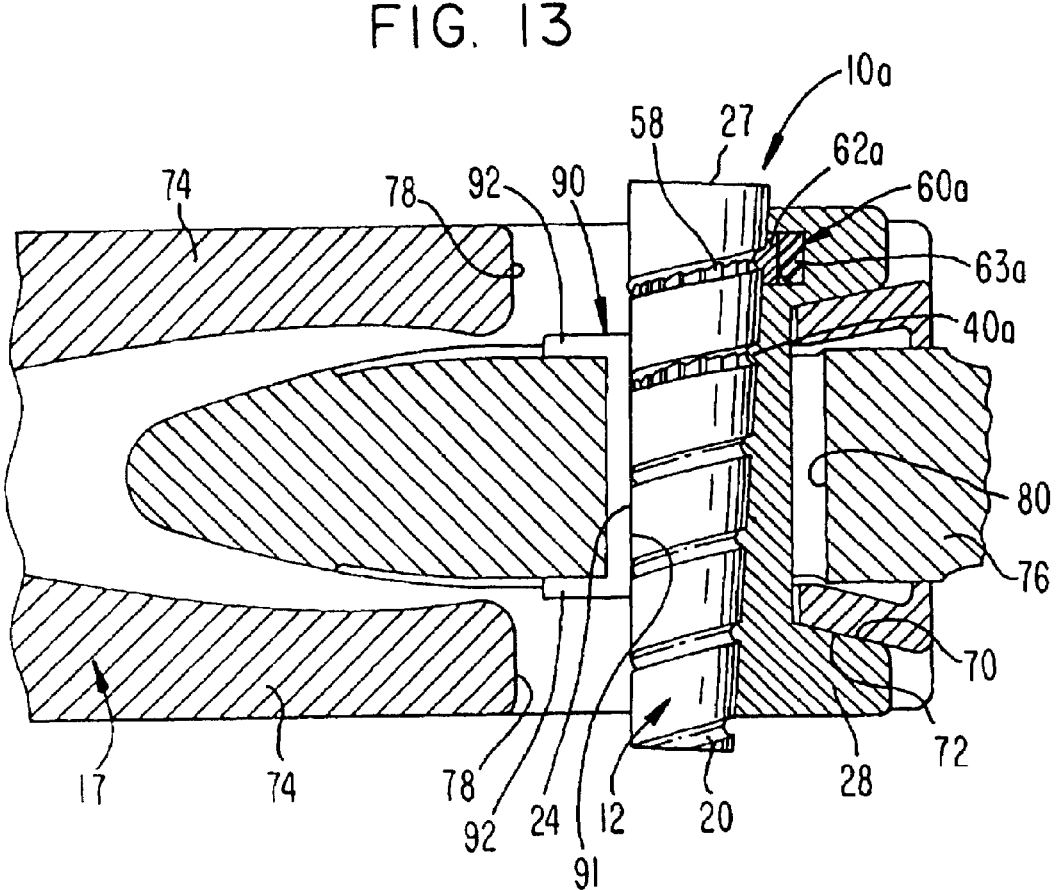
FIG. 13 is a cross-sectional view along the same line as FIG. 12 for an alternative embodiment including an insert between the wedge and support structure.
Figure 14:
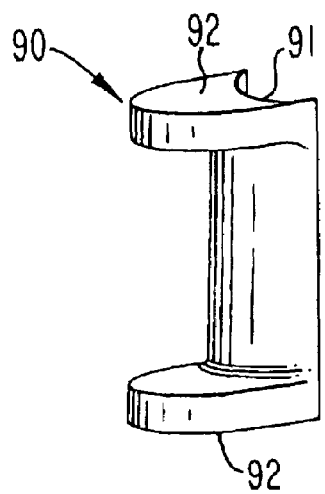
FIG. 14 is a perspective view of the insert used in the alternative embodiment of FIG. 13.

As noted above, an insert 90 can be provided as part of the lock between the front wall portion of the hole in the support structure and the wedge (FIGS. 13 and 14). In the illustrated embodiment, lock 10b is the same as lock 10a with the addition of insert 90; hence, common reference numbers have been used. The insert preferably includes a rear surface 91 provided a smooth recess to complement the shape of the wedge when the wedge is in the fully advanced position, although other shapes and/or the provision of ridges to be received in groove 20 (in addition to or in lieu of ridges 40) are possible. To prevent movement of the insert during turning of the wedge, the insert preferably includes lips 92 that are welded to lip 76. Nevertheless, a latch or other means could be used to secure the insert in place. The insert functions to protect the lip from wear and/or to fill an enlarged opening in the lip or other components.

A lock in accordance with the present invention could be used to secure other styles of adapters (or other wear members) to a bucket lip, such as disclosed in the co-pending patent application Ser. No. 10/425,606 filed Apr. 30, 2003, entitled Wear Assembly for the Digging Edge of an Excavator, which is hereby incorporated by reference in its entirety, or as disclosed in co-pending patent application Ser. No. 10/425,605 filed Apr. 30, 2003, entitled Wear Assembly for Excavating Digging Edge, also herein incorporated in its entirety by reference.

Other various alternatives can be used to provide additional support or to reduce the stress within the wedge during use and thereby increase the life of the components.

Figure 17:
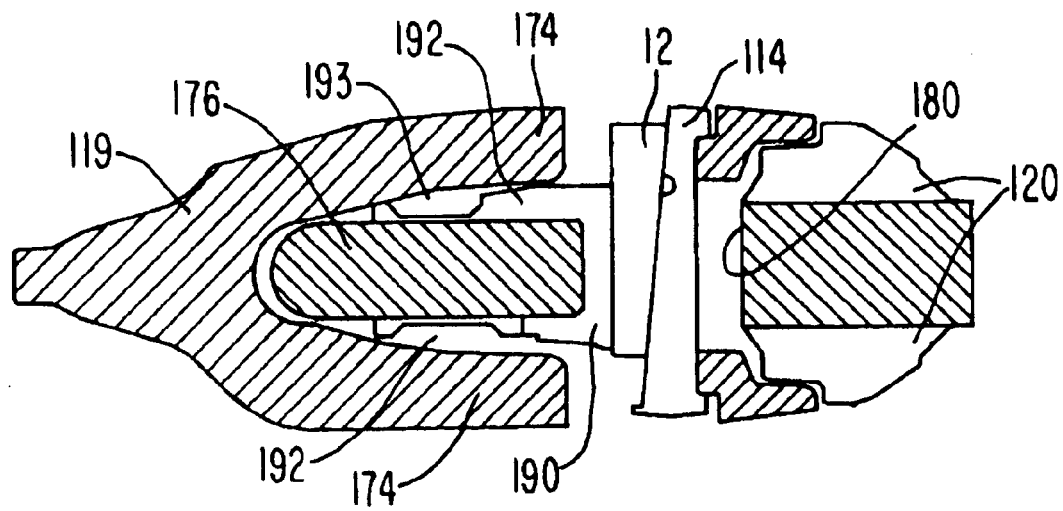
FIG. 17 is a cross-sectional view along the same line as FIG. 12 for an alternative embodiment.

As one example, a wedge 12 and spool 114 (FIG. 17), having essentially the same construction as spool 14a (although other variations are possible), are shown holding an adapter 119 to a lip 176 of an excavating bucket. In this example, the ends of legs 174 of adapter 119 are adapted to fit against stop blocks 120 for additional support, although the stop blocks are not essential and could be omitted. In addition, insert 190, between wedge 12 and the front wall of the opening 180 in the lip, is provided with extended arms 192 to overlie the inner and outer surface of the lip. These extended arms provide additional support for the insert and increased surfaces by which the arms can be welded to the lip. As can be appreciated, a clearance 193 can be provided within the adapter to accommodate the increased arm length.

Figure 18:
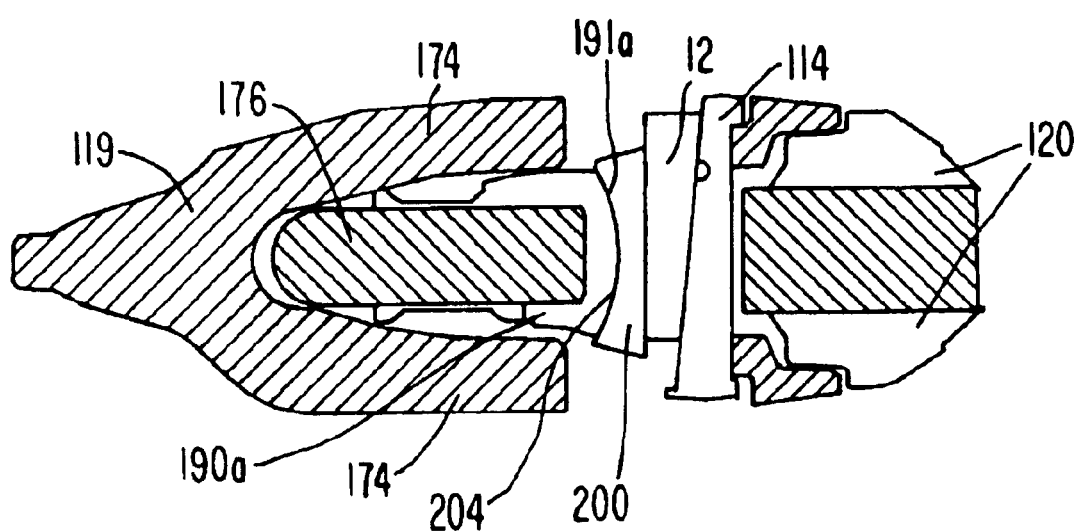
FIG. 18 is a cross-sectional view along the same line as FIG. 12 for another alternative embodiment.
Figure 19:
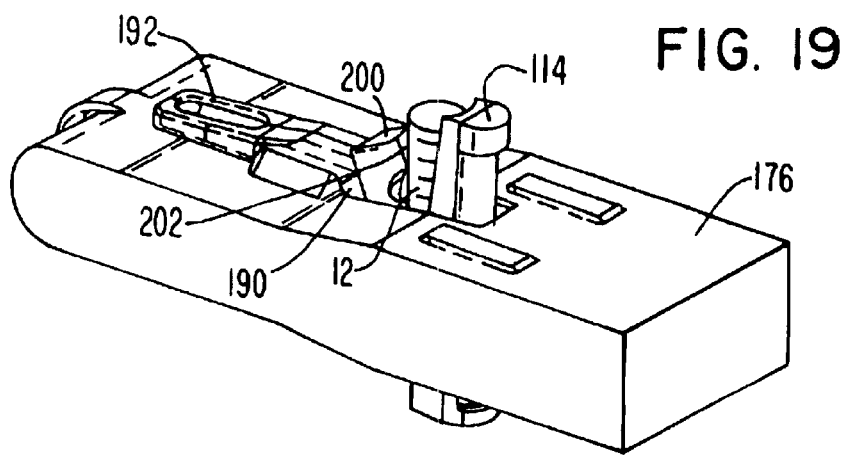
FIG. 19 is a perspective view of a cradle used in the alternative embodiment shown in FIG. 18 with the wear member omitted.

In a further example (FIGS. 18 and 19), a cradle 200 is provided between the insert 190a and wedge 112. Cradle 200 preferably includes a trough shaped rear surface 202 (like surface 91 of insert 90 in FIG. 14) to bear against the wedge (although other surfaces are possible), and a curved, concave front face 204 (i.e., curved generally about a transverse axis). In this embodiment, the rear surface 191a of insert 190a complements cradle surface 204 so as to be curved generally about a transverse axis (instead of a vertical axis as shown, e.g., in FIG. 14 for insert 90). Nevertheless, front surface 204 of cradle 200 could also have a concave, curved form to define a generally vertical tough to receive insert 190 generally as spool 14a or insert 90 receive wedge 12. The rear wall 191a of the insert 190a, then, would have a complementary convex or crowned surface shape be received within the formed trough. The trough and crowned surface could also be reversed with the trough on the insert and the crowned surface on the cradle. The front wall of opening 180 in lip 176 could be formed with the convex wall to directly abut the front face 204 of cradle 200, but an insert 190 is preferred to protect the lip and enable the fit with existing lip constructions.

When adapter 119 is used, the applied loads will tend to cause the adapter legs 174 to shift longitudinally, i.e., forward and rearward, along the inside and outside surfaces of the lip 176. Although the use of stop blocks 120 will limit the rearward motion, the legs will still tend to pull forward. In any event, this shifting of the legs can apply substantial compressive loading on the wedge and a build up of stress on the wedge, which leads to a reduced usable life. By using cradle 200, the wedge 12 and cradle 200 can swing about insert 190a (i.e., about the generally transverse axis) to accommodate the alternative shifting of the legs and thereby reduce the stress in the wedge, thus, increasing the usable life of the wedge.

Figure 18A:
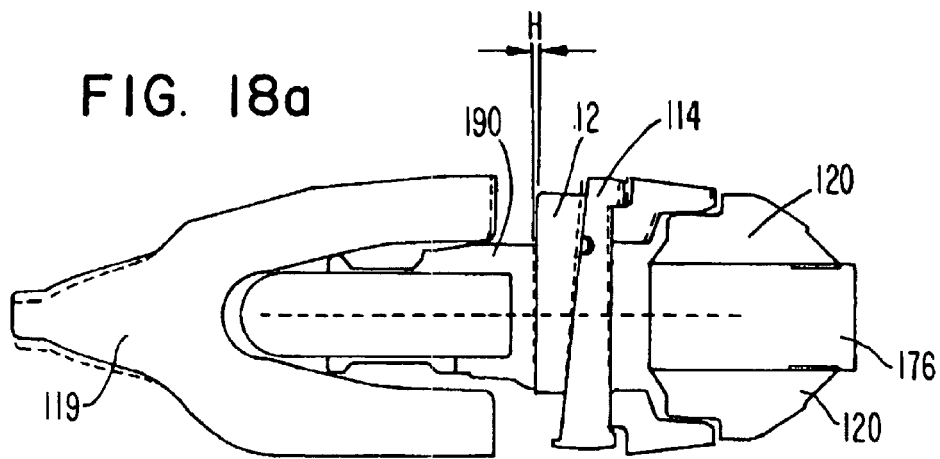
FIG. 18a is a cross-sectional view illustrating shifting of the wear member on a lock without a cradle.
Figure 18B:
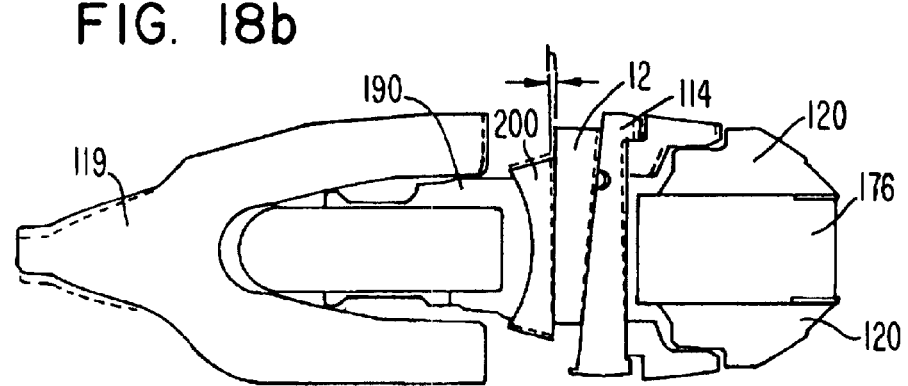
FIG. 18b is a cross-sectional view illustrating shifting of the wear member on a lock with cradle.

For example, as shown in FIGS. 18a and 18b, the application of a downward load on the front of the adapter will tend to cause the upper leg of adapter 119 to shift forward along the inside surface of the lip 176. When used without stop blocks 120, there will also be a concomitant rearward shifting of the lower leg. In regard to the present example, this forward shifting of the upper leg can cause a high compressive force to be applied to the wedge and create an interference fit H of certain magnitude that is usually accommodated by compression of the wedge. With the use of a cradle, as illustrated in FIG. 18b, the forward shifting of the upper leg is at least partially accommodated by shifting of the cradle so that the interference fit h is smaller in magnitude than interference H for the same amount of forward shifting of the adapter leg. The shifting of the wedge enables the lock to automatically adjust so as to increase the contact surface area resisting the loads and thereby reduce the likelihood of localized peening or other damage to the lock components—particularly the wedge.

Figure 20:
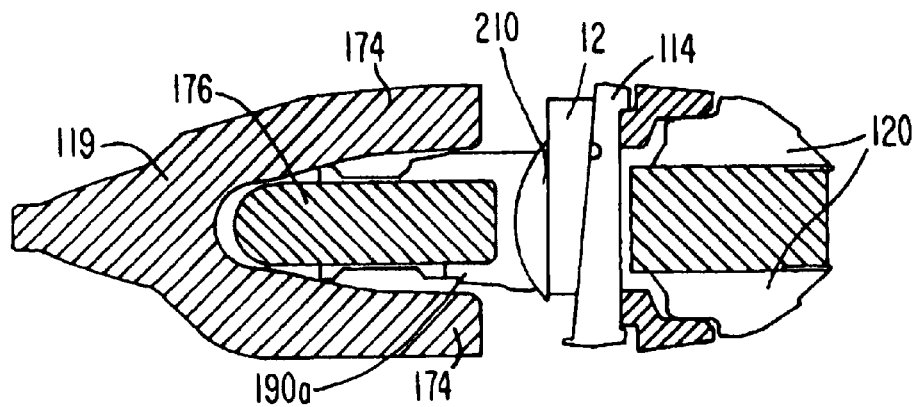
FIG. 20 is a cross-sectional view along the same line as FIG. 12 for another alternative embodiment.

In an alternative embodiment (FIG. 20), cradle 210 includes a curved convex front surface 212 (i.e., curved about a generally transverse axis) to be received against a concave rear surface of insert 190b. In this embodiment, the cradle and wedge are adapted to shift to accommodate the shifting of the legs of the adapter 119 under load as discussed above for cradle 200.

Figure 21:
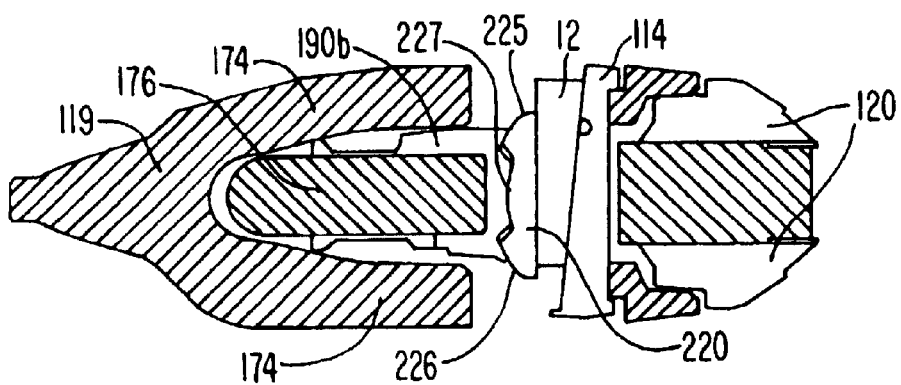
FIG. 21 is a cross-sectional view along the same line as FIG. 12 for another alternative embodiment.
Figure 22:
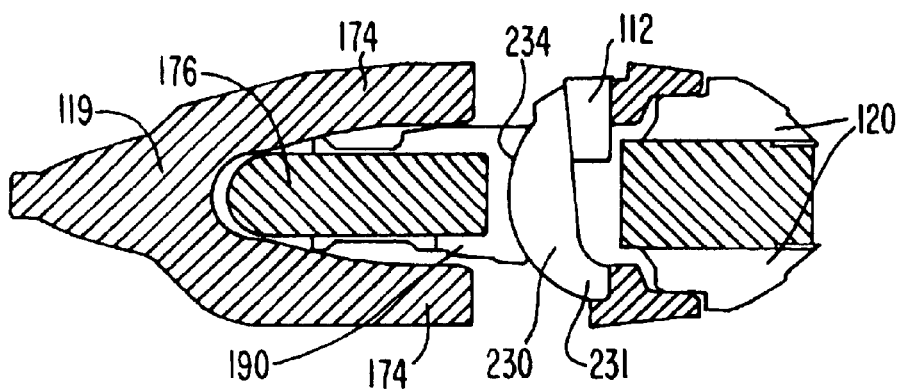
FIG. 22 is a cross-sectional view along the same line as FIG. 12 for another alternative embodiment.

As another alternative construction (FIG. 21), cradle 220 is formed with a front face 224 having an offset formation. More specifically, front face 224 includes an upper portion 225 and a lower portion 226, each having a convex curvature such as used in cradle 210. The central portion 227 of front face 224 has recessed convex curved surface preferably about the same radius of curvature origination point as upper and lower portions 225, 226. Insert 190b has a complementary rear surface. Cradle 220, thus, operates in essentially the same way as cradle 210, but is thinner for use in smaller openings in lip 176 and adapter 119.

As another alternative, cradle 230 can be used with a shortened wedge 112 to accommodate the shifting of the adapter legs 174. In this embodiment, the spool is also eliminated. More specifically, cradle 230 includes a convex front face 234, in generally the same way as cradle 210. However, cradle 230 also includes an extended arm 231 which abuts against the lower leg 174 in place of spool 14.

Further, cradles can be used in the same way with conventional wedge and spool arrangements (i.e., non-rotating wedges) to provide the same shifting of the lock to better accommodate shifting of the legs.

Figure 23:
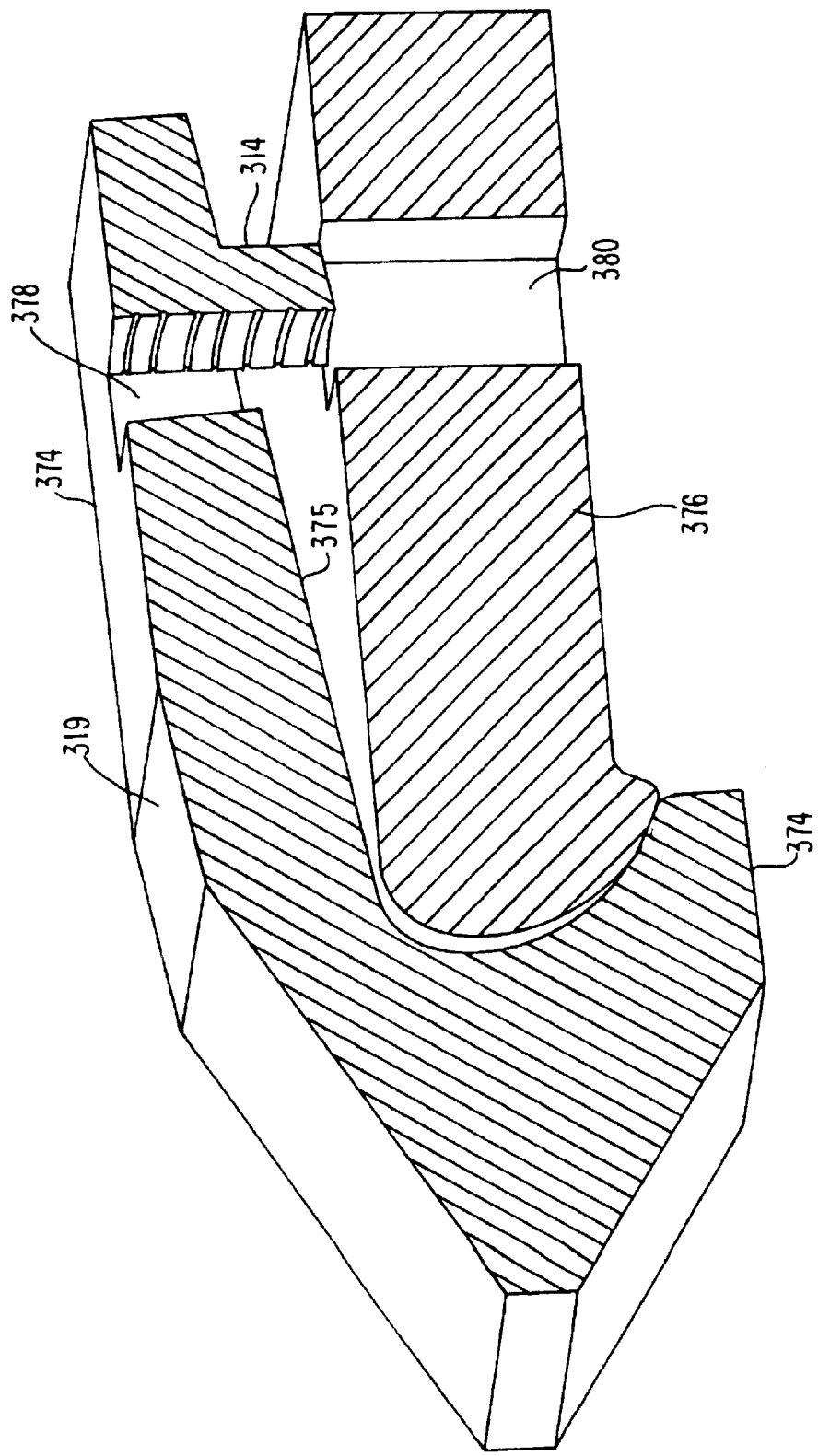
FIG. 23 is an perspective view of another alternative embodiment wherein the wear member is partially fit onto a lip.
Figure 24:
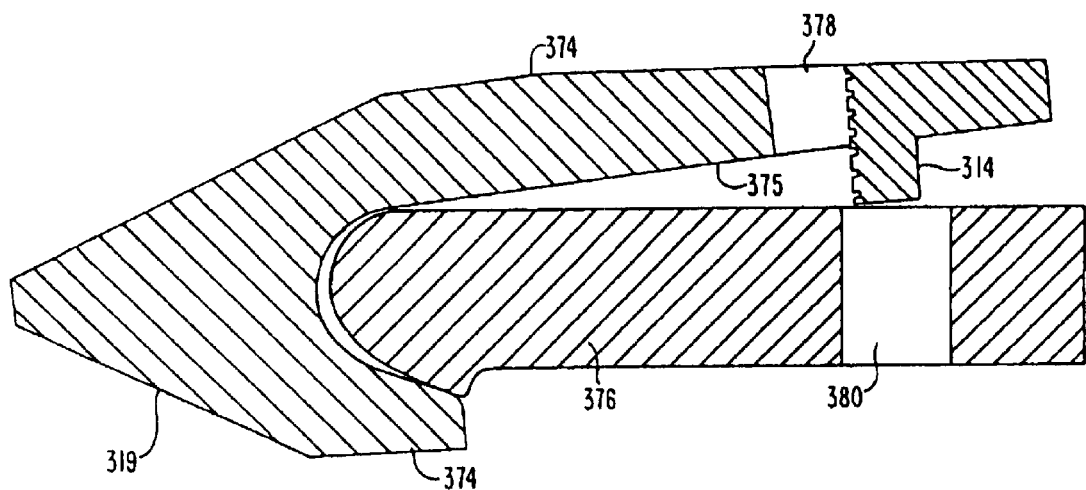
FIG. 24 is a side view of the embodiment of FIG. 23 in the same orientation.
Figure 25:
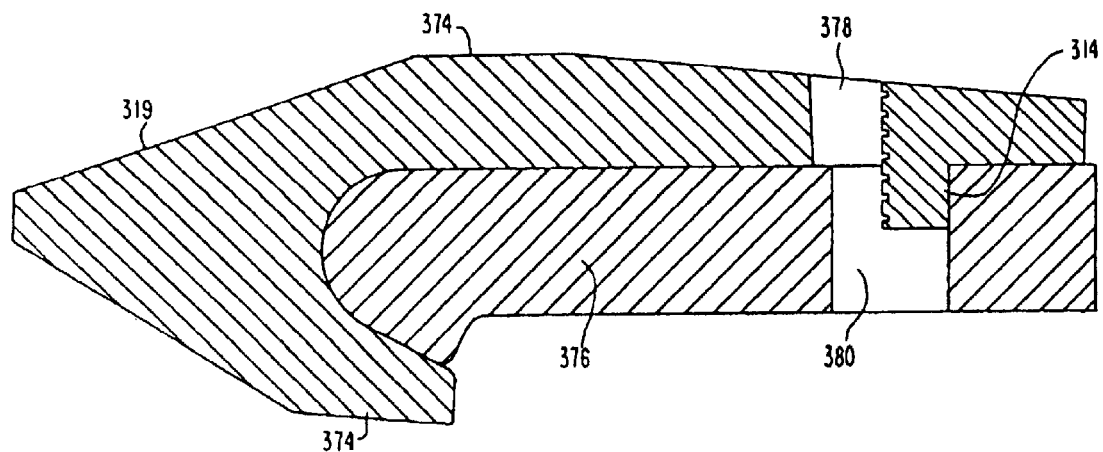
FIG. 25 is a partial cross-sectional view of the fit of the wear member in FIG. 23 with the hole in the lip when fully fit on the lip.

In another alternative embodiment (FIGS. 23-25), the spool 314 is formed integrally with the wear member 319. In this construction, a shroud 319 or other wear member includes a pair of legs 374 to straddle the lip 376. One leg 374a (in this example, the inner leg) is formed with an opening 378 for receiving a wedge 12. A spool 314 is cast (or otherwise formed) as an integral portion of leg 374 to form the rear wall of opening 378. Spool 314 is provided with the same front construction as disclosed above for spool 14a (or spool 14). Spool 314 further projects from an inner side 375 of leg 374 to fit within hole 380 in lip 376 against rear wall 381. Leg 374b is shorter than leg 374a to enable the wear member 319 to swing onto lip 376 and place shroud 314 into opening 380. In FIGS. 23 and 24, wear member 319 is shown partially swung about lip 376 with shroud 314 about to be placed within hole 380 in lip 376. Once wear member 319 is fully fit on lip 376, wedge 12 is inserted and tightened as disclosed above.

The lock of the present invention can also be used in a variety of different assemblies to hold separable parts together. While the invention is particularly suited for use in securing a point to an adapter, and an adapter or shroud to a lip, the invention can be used to secure other wear members in excavating operations, or simply other separable components that may or may not be used in excavating operations. Further, the above-discussion concerns the preferred embodiments of the present invention. Various other embodiments as well as many changes and alterations may be made without departing from the spirit and broader aspects of the invention as defined in the claims.

The invention claimed is:

1. A lock adapted for receipt into an opening defined by two separable components in a wear assembly for excavating equipment, the lock comprising:
    a wedge having a first end, a second end, a longitudinal axis extending centrally through the first and second ends, and a rounded exterior surface about the longitudinal axis that tapers toward the first end for initial receipt into the opening, the exterior surface including a helical groove; and
    a spool including a body and arms at opposite ends of the body, each arm including an inner surface that tapers outward in a rearward direction, a trough on the body having a generally concave surface for receiving the wedge, and a series of helical ridges in spaced apart relation along the trough to engage the helical groove on the wedge;
    the wedge and the spool being threadedly coupled together in the opening by the engagement of the ridges in the helical groove such that rotation of the wedge about the longitudinal axis translates the wedge in the opening in a direction generally parallel to the longitudinal axis and along the trough of the spool to tighten the lock in the opening thereby causing the wedge and the spool to press the separable components in opposite directions to hold the two components together.

2. A lock in accordance with claim 1 further including a tool receiving formation on the second end for rotating the wedge.

3. A lock adapted for receipt into an opening defined by two separable components in a wear assembly for excavating equipment, the lock comprising:
    a wedge having a first end, a second end, a longitudinal axis extending centrally through the first and second ends, and a rounded exterior surface about the longitudinal axis that tapers toward the first end for initial receipt into the opening, the exterior surface including a helical groove; and
    a spool including a trough having a generally concave surface for receiving the wedge, and a series of helical ridges in a spaced apart relation along the trough to engage the helical groove on the wedge;
    the wedge and the spool being threadedly coupled together in the opening by the engagement of the helical ridges in the helical groove such that rotation of the wedge about the longitudinal axis translates the wedge in the opening in a direction generally parallel to the longitudinal axis and along the trough of the spool to tighten the lock in the opening thereby causing the wedge and the spool to press the separable components in opposite directions to hold the two components together.

4. A lock in accordance with claim 3 wherein the spool includes a body and arms at opposite ends of the body, each said arm including an inner surface that tapers outward in a rearward direction.

5. A lock in accordance with claim 3 further including a tool receiving formation on the second end of the wedge for rotating the wedge.

6. A lock in accordance with claim 3 wherein the spool includes a body and aims at opposite ends of the body extending away from the trough.

7. A lock in accordance with claim 3 wherein the wedge includes a spiral land segment between adjacent turns of the groove, and the land segment defines a first bearing surface to contact one of the separable components and an opposite second bearing surface to contact the trough of the spool to thereby resist loading between the components and prevent separation of the separable components.

8. A lock in accordance with claim 7 wherein the width of the land segment is larger than the width of the groove.

9. A lock in accordance with claim 3 wherein the groove in the wedge has a width that narrows as the groove extends from the first end toward the second end along a length of groove that engages the helical ridges of the spool.

10. A lock in accordance with claim 3 wherein the groove has a width and a pitch, and the width is about one-eighth of the pitch.

11. A lock in accordance with claim 3 wherein the groove extends along the wedge at an angle, and the angle changes to become more shallow as the groove extends toward the second end.

12. A wear member for excavating equipment comprising a front end, a rear end, converging walls that converge toward the front end, side walls extending between the converging walls, a socket that opens in the rear end to receive a nose fixed to the excavating equipment, an opening extending through one of said walls to communicate with the socket, and a resiliently biased latch projecting into the opening and defining a thread formation to engage a threaded wedge to secure the wear member to the nose.

13. A wear member in accordance with claim 12 which further includes a cavity for receiving the latch, and wherein the latch includes a body defining the thread formation and a resilient member to bias the latch outward.

14. A wear member in accordance with claim 13 wherein the thread formation on the body includes a helical ridge.

15. A wear member in accordance with claim 14 wherein the opening includes a series of spaced apart helical ridges on a wall of the wear member in alignment with the helical ridge on the body to engage a groove in the wedge.

16. A wear member in accordance with claim 13 wherein the thread formation includes a ridge shaped as a spiral segment.

17. A wear member in accordance with claim 12 wherein the thread formation includes a ridge shaped as a spiral segment.

18. A wear member in accordance with claim 12 wherein the thread formation includes a series of helical ridges in a spaced apart relation along the trough to engage a helical groove on the wedge.

19. A wear member in accordance with claim 18 wherein a span of a wall of the wear member in the opening between each of the adjacent ridges defines a bearing surface to bear against a complementary land segment defined on the wedge.

20. A wear member in accordance with claim 18 wherein the ridges each has a first width and the bearing surfaces each has a second width extending between the adjacent ridges, and wherein the second width is substantially larger than the first width.

\* \* \* \* \*